Dec. 24, 1929.  G. KOMAREK  1,740,657
FLUXER
Filed July 16, 1928  7 Sheets-Sheet 1

Inventor
Gustav Komarek
By Cornwall & Janus
Attys.

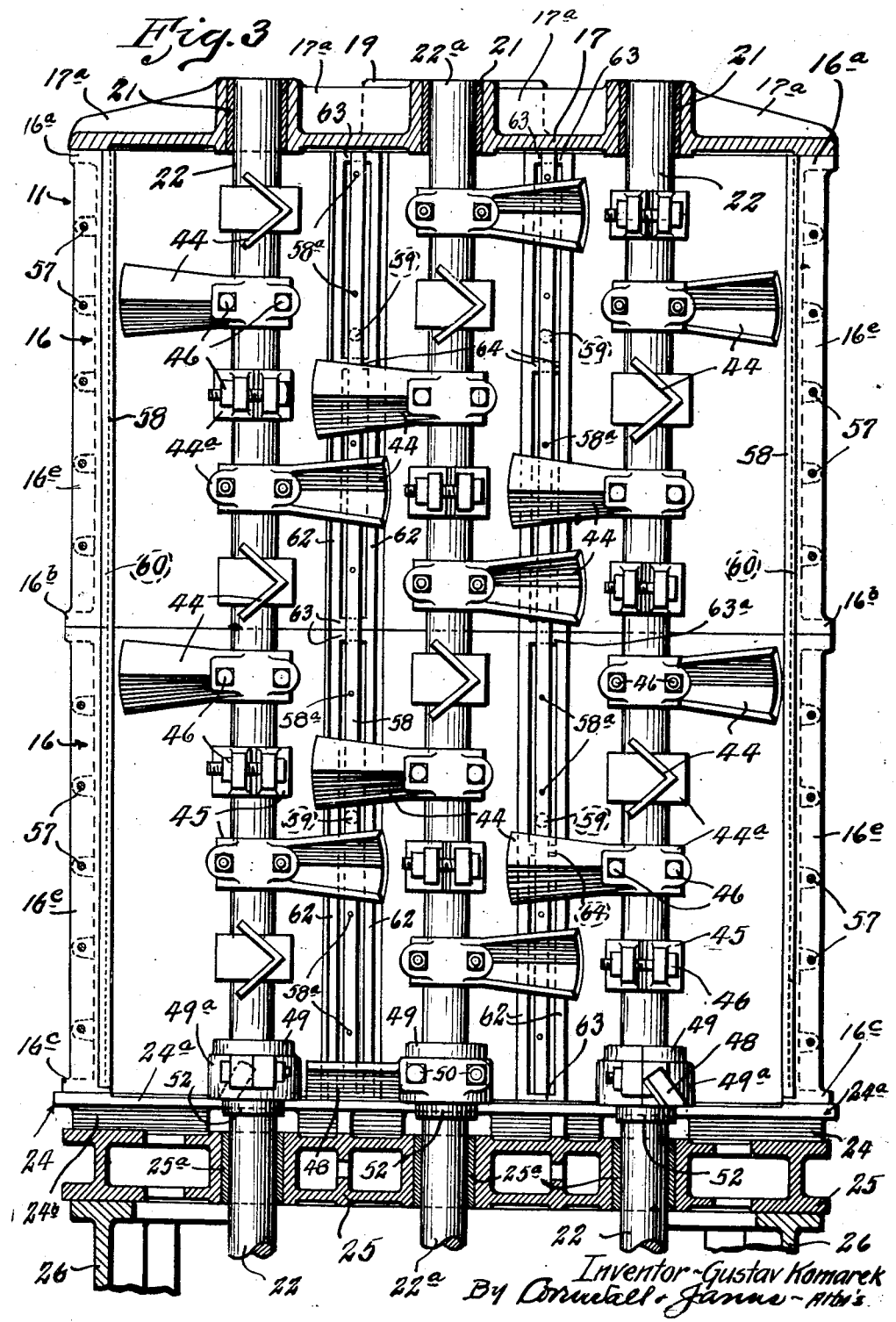

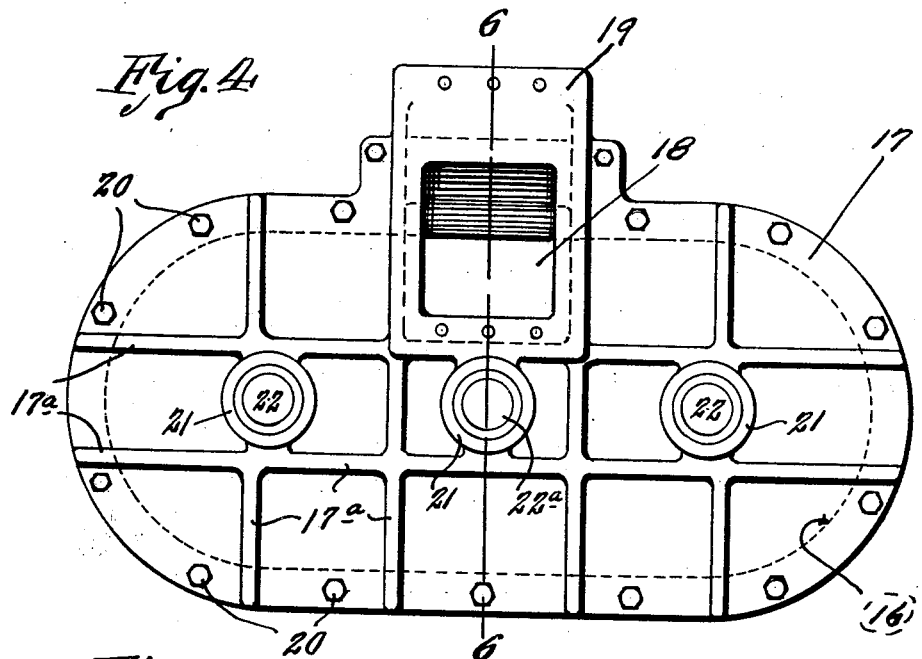
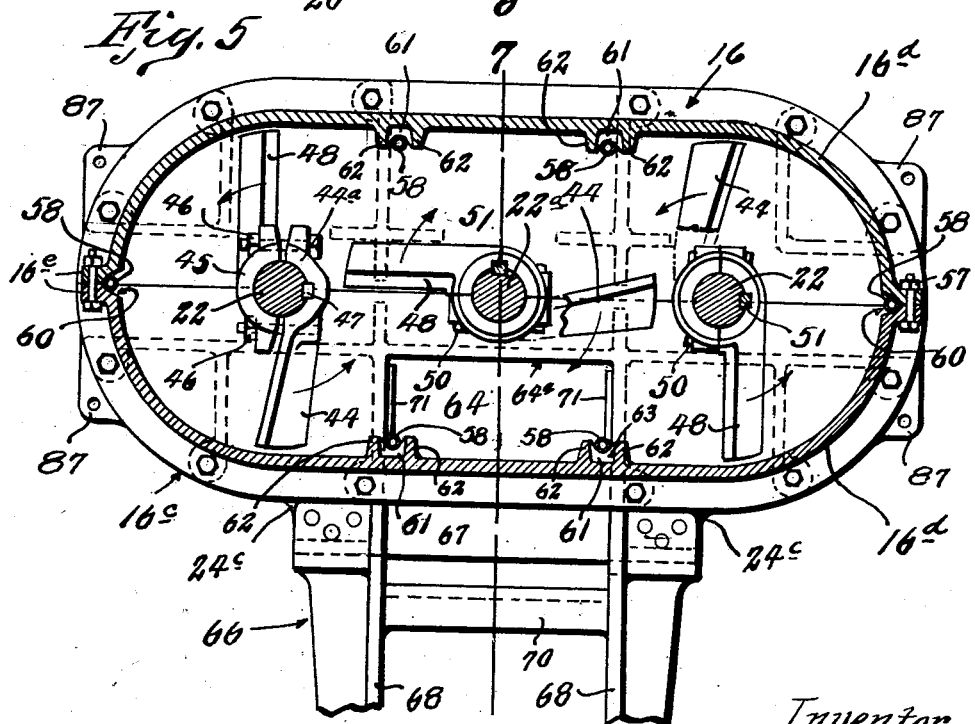

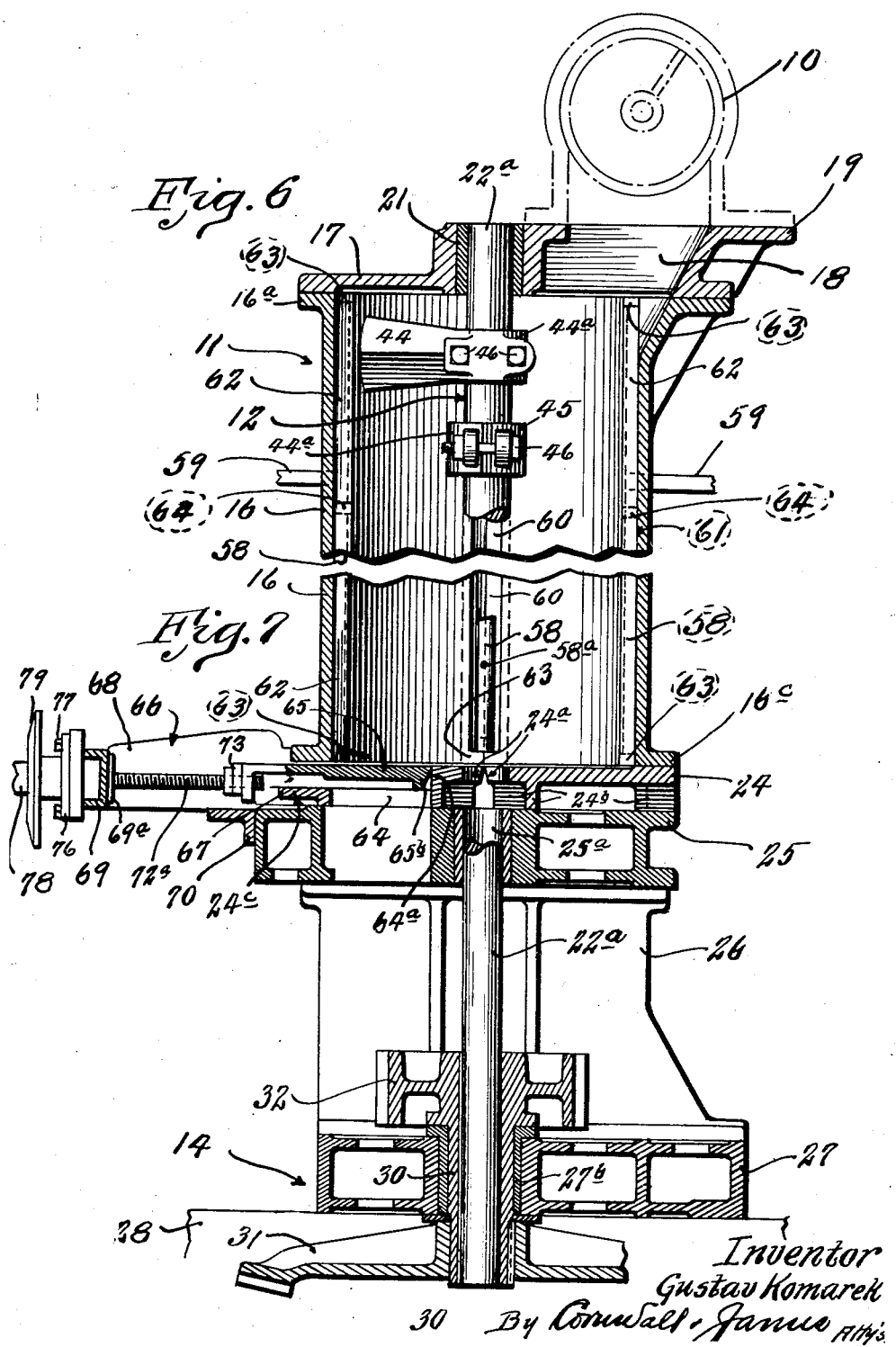

Dec. 24, 1929.                G. KOMAREK                1,740,657
                                 FLUXER
                            Filed July 16, 1928         7 Sheets-Sheet 5
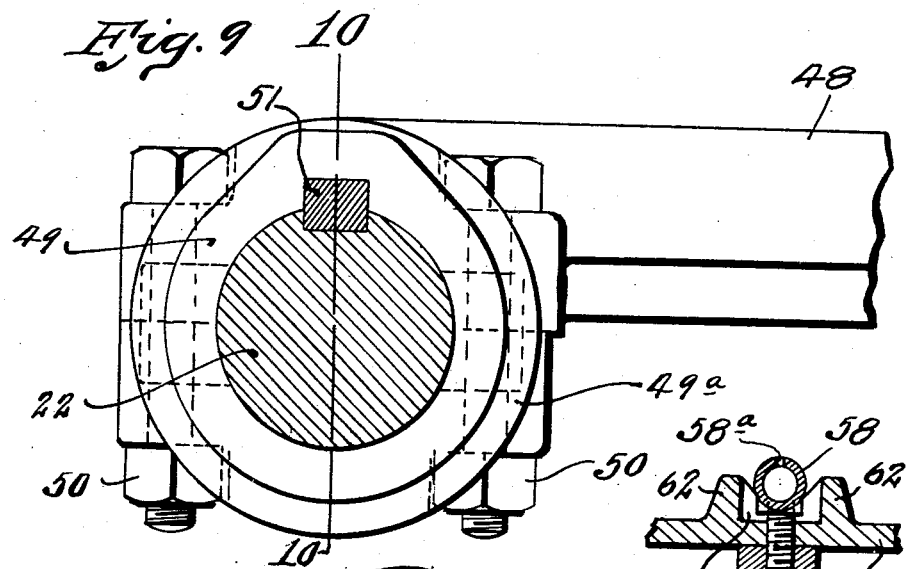
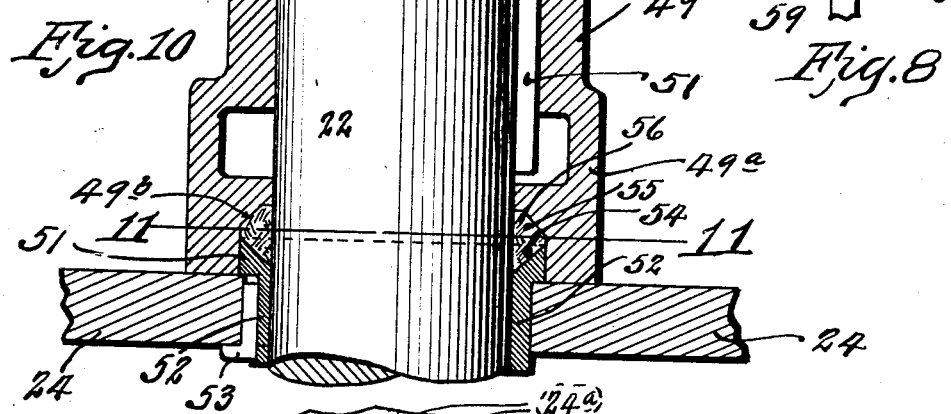
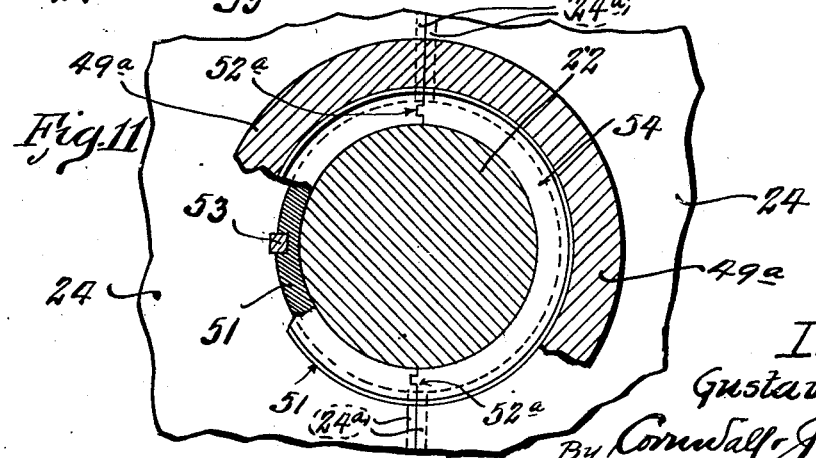
Inventor
Gustav Komarek
By Cornwall & Jannus
Attys.

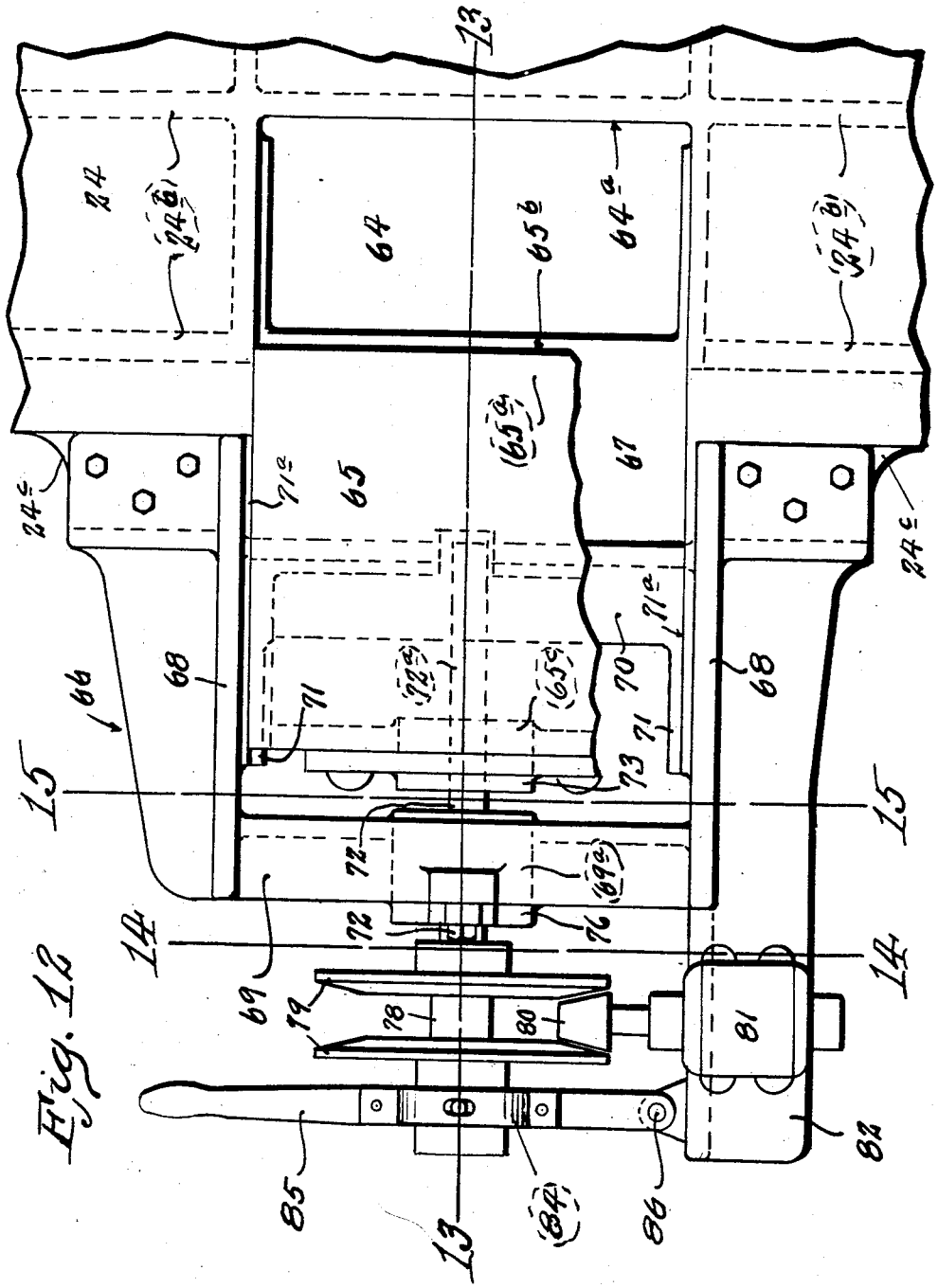

Dec. 24, 1929.    G. KOMAREK    1,740,657
FLUXER
Filed July 16, 1928    7 Sheets-Sheet 7
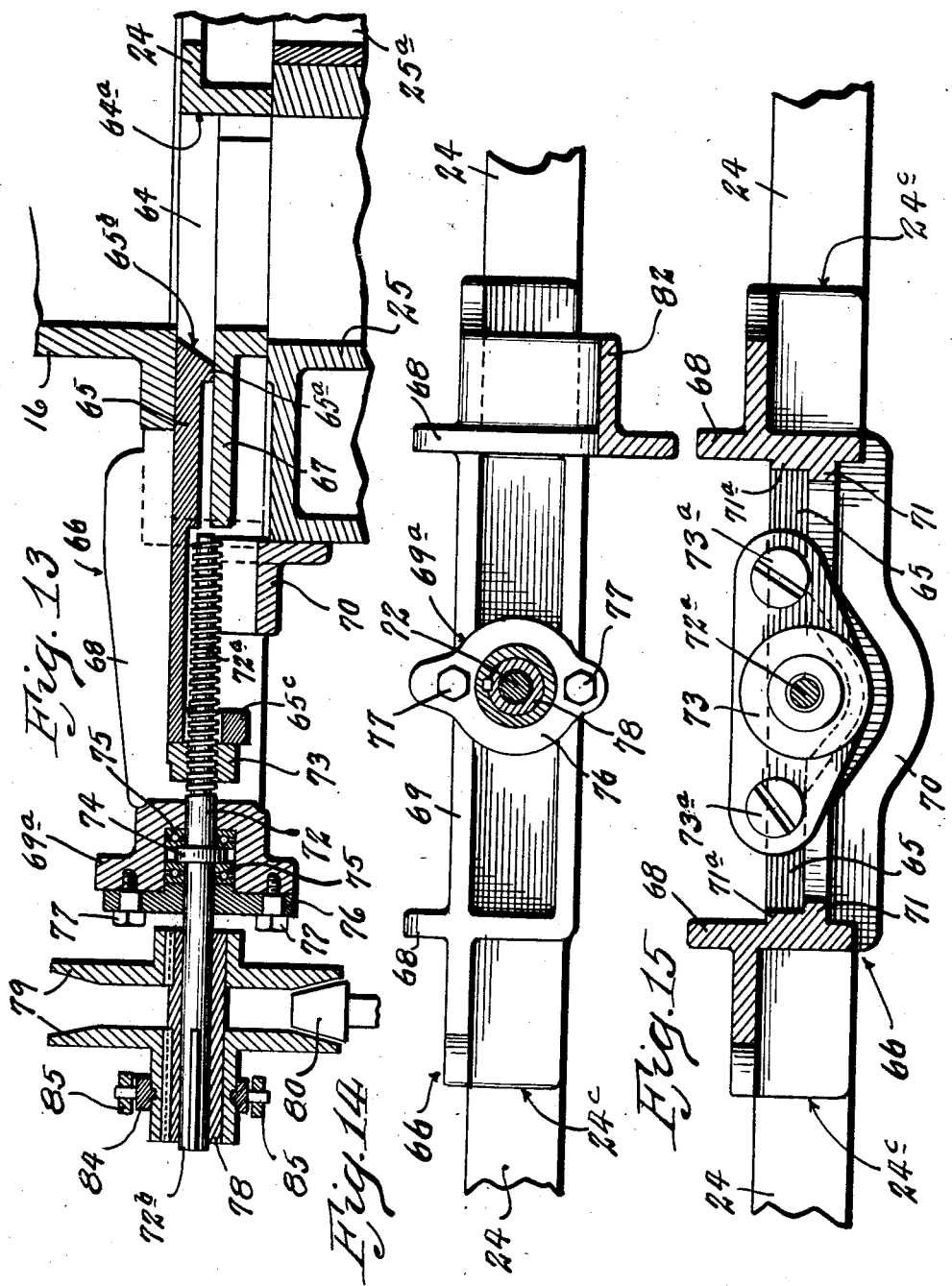
Inventor
Gustav Komarek
By Cornwall & Janus Att'ys.

Patented Dec. 24, 1929

1,740,657

UNITED STATES PATENT OFFICE

GUSTAV KOMAREK, OF CHICAGO, ILLINOIS, ASSIGNOR TO KOMAREK-GREAVES AND COMPANY, OF CHICAGO, ILLINOIS, A CORPORATION OF ILLINOIS

FLUXER

Application filed July 16, 1928. Serial No. 293,230.

This invention relates to new and useful improvements in fluxers or mixing apparatus.

This type of fluxer is used to work or mix briquetting material by means of stirring arms which are so disposed and actuated as to agitate the material contained in the mixing chamber and cause it to be thoroughly mixed and gradually fed toward the discharge opening of said chamber. Generally steam or other suitable fluid is injected into the mixing chamber for conditioning the briquetting material and facilitating its passage through the mixing chamber. The material after being properly mixed is discharged at the lower end of the fluxer and is then delivered to a suitable machine which forms the material into briquets of suitable sizes and shapes.

The manufacture of briquets from loose or pulverized material has become quite extensive, one of the principal lines of manufacture being the production of fuel briquets. However, there are other lines of activities in which the material is briquetted, as, for instance, in chemical industries using raw material such as salt, sulphur, etc. Where such material is used in a pulverized state, it cakes readily and cannot be successfully treated while, when such material is in briquet form, it can be handled efficiently and without any trouble and will not cake or clog the apparatus.

It is the primary object of my invention to provide a fluxer which is efficient in operation and in which the material not only is prevented from caking in the mixing chamber, but is thoroughly worked by the kneading action of the stirring arms and is gradually fed throughout the entire area of the fluxing chamber toward the discharge opening thereof.

Other objects of the invention are to so arrange the fluxer that the briquetting material is caused to traverse the mixing chamber of said fluxer in a vertical plane, thereby being assisted by gravity in its downward movement. The mixing or stirring arms are angular in cross section and are disposed on a plurality of vertically mounted shafts and are operated in horizontal planes at right angles to the line of movement of the material. Thus a continuous shifting and working of the mixture takes place as the rotary action of the kneading or stirring arms of one shaft pushes a certain amount of the material into the path of the arms of the other shafts. Due to the double angular surfaces of the V-shaped arms, a more thorough kneading or working of the mixture is produced. This not only insures proper working of the material but also forces the material downwardly and prevents said material from caking in said mixing chamber.

Further objects of the invention are to provide means for delivering suitable fluid to the briquetting material while it is being stirred in the fluxer, the fluid being used to condition the material properly and facilitate the briquetting thereof.

Still further objects of the invention are to provide a wearing plate for the lower end of the fluxer chamber, said plate being formed sectional, separable along a medial line to enable the replacement thereof when worn, without the necessity of dismantling the fluxer chamber or any parts thereof, and to provide shaft seals or packing glands for the shafts adjacent to the wearing plate whereby the briquetting material is successfully excluded from the bottom shaft bearings.

Still other objects of the invention are to so arrange the driving connections between the stirring arm shafts that the driving torque is distributed to all of the shafts independently of the shaft carrying the main driving gear.

Still further objects of my invention are to provide a gate slidably mounted in the wearing plate for controlling the discharge opening of the fluxer and to provide manually controlled motor drive for said gate whereby the latter may be operated automatically in either direction.

Additional objects of the invention are to generally improve upon and simplify the construction of the fluxer of the type described whereby said fluxer can be readily assembled and disassembled and is highly efficient in performing its intended functions.

With these and other objects in view, my invention consists in certain novel features of construction and arrangement of parts, hereinafter more fully described and claimed, and illustrated in the accompanying drawings, in which—

Figure 3 is a vertical cross section taken on line 3—3 of Figure 1.

Figure 4 is a top plan view of the fluxer.

Figure 5 is a horizontal cross section taken on line 5—5 of Figure 3.

Figure 6 is a vertical section of the upper end of the fluxer taken on line 6—6 of Figure 4.

Figure 7 is a vertical cross section taken on line 7—7 of Figure 5.

Figure 8 is a detail cross section taken on line 8—8 of Figure 6.

Figure 9 is a horizontal cross section through one of the stirring arm shafts and showing the mixer arm and the packing gland.

Figure 10 is a vertical cross section taken on line 10—10 of Figure 9.

Figure 11 is a horizontal cross section taken on line 11—11 of Figure 10.

Figure 12 is a top plan view of a portion of the wearing plate and the gate carried thereby.

Figure 13 is a vertical section taken on line 13—13 of Figure 12.

Figure 14 is a vertical section taken on line 14—14 of Figure 12.

Figure 15 is a vertical cross section taken on line 15—15 of Figure 12.

Figure 1:
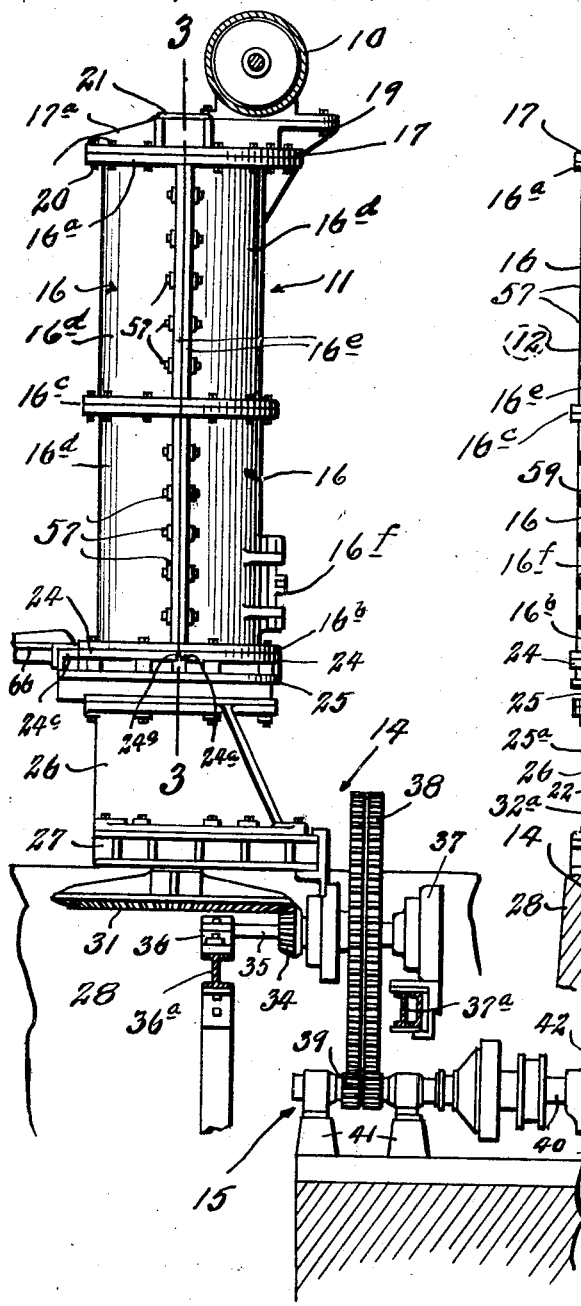
Figure 1 is a side elevational view of the fluxer and the driving mechanism therefor.
Figure 2:
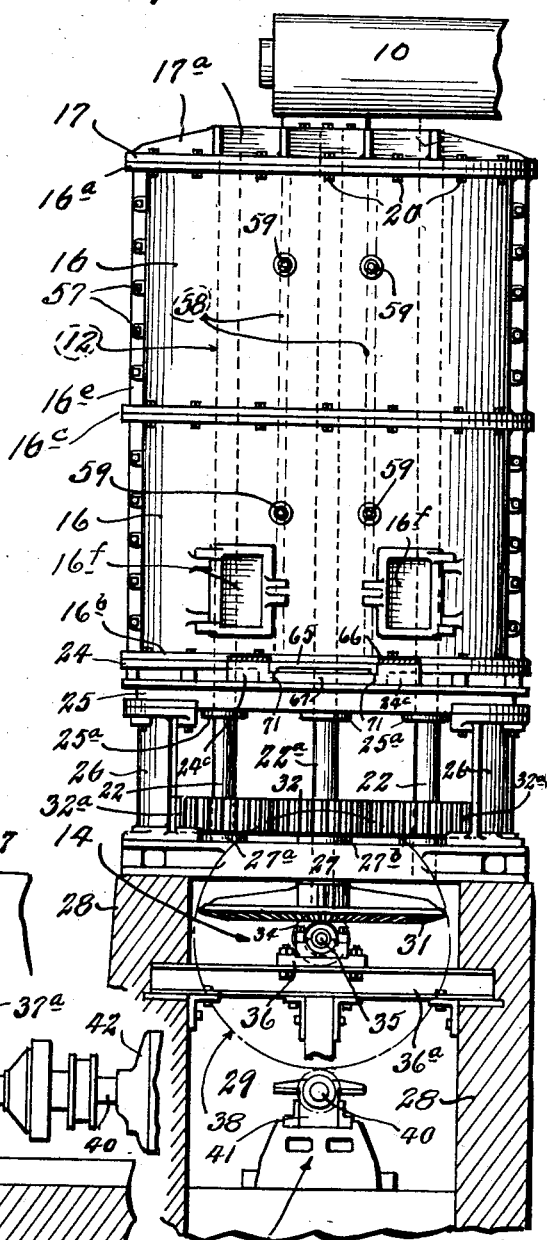
Figure 2 is a front elevational view of the same.

While the fluxer of my improved construction is applicable for working various materials, the construction of the fluxer as shown and described in the instant case is primarily intended for use in treating pulverized fuel, such as coal dust for briquetting purposes.

In the manufacture of coal briquets, the coal dust (coal of small sizes reduced so that it will pass through a screen of about twenty mesh) is mixed with an approximate proportion of a suitable binder (coal tar, asphaltum, or other binder) and the mixture is then fed to a briquet forming machine where the material is compressed into briquets of suitable sizes and shapes.

Referring by numerals to the accompanying drawings, 10 indicates a material conveyor or feeder, 11 a fluxer into which the material is discharged, 12 stirring mechanism arranged in said fluxer, 14 driving connections for said stirring mechanism, and 15 actuating means for said driving connections.

The fluxer comprises a pair of vertically disposed tubular members 16 secured together in superimposed relation to form a single vertically disposed mixing chamber. The upper end of the fluxer is closed by a top plate 17 having an intake opening 18 with which the conveyor 10 communicates. The latter is supported at one end on said plate by means of a horizontally disposed shelf 19 which is formed integral with said plate. Plate 17 is secured to the flanged upper end 16$^a$ by suitable attaching means 20. A series of bearings 21 is carried by plate 17 and receive the upper ends of shafts 22. Bearings 21 and plates 17 are reinforced by a plurality of upwardly projecting vertically disposed reinforcing ribs 17$^a$ which are formed integral with said plate and are suitably spaced thereon.

Where two or more sections 16 are used in superimposed relation, the abutting flanged ends are secured together as indicated at 16$^b$.

The lowermost fluxer section 16 rests on and is secured to a wearing plate 24, as indicated at 16$^c$, and said plate in turn rests on and is secured to a top support plate 25. The latter is supported at each end by a pedestal 26 and the lower ends of the latter rest on and are secured to a base plate 27. The ends of the base plate are arranged on tops of concrete walls 28 which are spaced from each other to provide a pit 29 for receiving the driving means 15.

Shafts 22 are arranged in a straight line in alignment with the medial line of the fluxer 16 as shown in Figures 4 and 5. Each of said shafts is journaled in bearings 25$^a$ formed in plate 25 and said shafts extend therethrough and have their lower ends journaled in bearings 27$^a$ disposed in base plate 27. The center shaft 22$^a$ extends below base plate 27 and has fixed thereon a sleeve 30, the lower end of which projects below bearing 27$^b$ and has fixed thereto a large beveled gear 31. The upper end of sleeve 30 projects above bearing 27$^b$ and has formed integrally therewith a spur gear 32 which is substantially of the same size and pitch as spur gears 32$^a$ fixed to shaft 22, whereby all of said shafts are simultaneously operated at the same speed.

A beveled pinion 34 of driving means 15 meshes with gear 31 of driving connection 14, thereby setting in operation the stirring mechanism 12. This pinion 34 is fixed to a horizontally disposed shaft 35 which is journaled in bearings 36 and 37 carried, respectively, by beams 36$^a$ and 37$^a$. Said beams extend transversely of said shaft and are suitably supported. A large spur gear 38 is fixed on shaft 35 and meshes with a pinion 39 fixed to a shaft 40. The latter is journaled in suitable bearings 41 below shaft 38 and is driven in any suitable manner, such as an electric motor 42.

The actuating means just described is disposed in pit 29, preferably rearwardly of the vertical axis of fluxer 12, in order not to interfere with the disposal of treated material discharged from the lower end of the fluxer.

The stirring mechanism 12 includes in addition to the vertically disposed shafts 22 a series of stirring arms 44 fixed at spaced intervals on each shaft. These arms are preferably triangular in cross section with the apices presented in the line of rotation, and the depth of each arm increases gradually toward the free end thereof so that the cross sectional area of the arm is greater at the outer end than it is adjacent to the shaft. Each arm 44 is provided with a semi-circular portion 44$^a$ which partially embraces shaft 22 and cooperates with a complementary portion 45, there being securing means 46 provided for engaging said portions and clamping them in position on the shaft.

A key 47 engages key-ways formed in the shaft and in each portion 44$^a$ and locks arm 44 in non-rotative engagement with the shaft. Arms 44 are spaced radially about the axis of each shaft throughout the entire height of the fluxer and in predetermined relation with the arms of the adjacent shaft so that during the actuation of said shafts said arms or paddles do not interfere with each other but serve to agitate the material in a manner most suitable for properly stirring the material and gradually feeding it downwardly.

Each shaft 22 carries below the lowermost arm 44 a sweeper arm 48 which is inclined from vertical plane and has its lower edge operating over the surface of the wearing plate 24 in order to keep the latter clean and prevent caking of the material thereon.

The inner end of each arm terminates in a tubular portion 49 formed in two sections clamped on the shaft by means of securing devices 30 and is further secured to said shaft by a key 51 as shown in Figures 9 and 10. The lower end of tubular portion 49 is enlarged as indicated at 49$^a$ and fits snugly over the enlarged projecting end 51 of a sleeve 52, which latter is removably arranged in wearing plate 24 and is held stationarily therein by means of a key 53. This sleeve forms a bearing for shaft 22 at the point where the latter traverses said wearing plate. The upper end 51 of said sleeve is provided with an outwardly and upwardly flared mouth 54 which cooperates with the upper end of a circular recess 49$^b$ formed in enlargement 49$^a$ to provide a chamber 55 in which is received a suitable packing material 56. Thus a packing gland is provided for each shaft 22 which prevents briquetting material contained in the fluxer from entering the shaft bearings. The lower end of enlargement 49$^a$ terminates against the wearing plate 24 a suitable distance below the upper edge of mouth 54 so as to obviate any danger of the briquetting material finding its way into the packing 56. Each sleeve 52 is formed preferably of two semi-circular sections having tongue and groove interengagement with each other as shown at 52$^a$ in Figure 11, the line of division being in alignment with the line of separation of the two halves of the wearing plate 24. Thus the bearing sleeve 52 can be replaced without the necessity of removing the shafts from position. Each fluxer section 16 is formed of two members 16$^a$, separable on a medial line. These members are clamped together by suitable fastening devices 57 passing through aligned apertures formed in the vertically disposed flanges 16$^e$ formed integral with the edges of the two members or halves forming the section. Thus any part of the fluxer can be inspected and the necessary repairs made therein by simply removing one of the medial sections. Doors 16$^f$ are preferably provided in one of the lower section members.

In the treatment of briquetting material, it is usually necessary to inject fluid into the fluxing chamber so as to maintain the briquetting material in proper plastic or semi-plastic condition. For instance, in the case of fuel briquets, steam is injected into the mixing chamber so as to maintain the material at proper temperature and render it sufficiently semi-plastic so that it will readily traverse the mixing chamber. In the present invention I provide a series of stand pipes 58 arranged at spaced intervals against the inner side of the wall of the fluxer casing. These pipes are provided with a series of discharge apertures 58$^a$ opening inwardly into the fluxer through which the steam is admitted thereinto. A supply pipe 59 passes through the wall of the casing and communicates with each stand pipe 58 and supplies the steam thereto. Any number of supply pipes can be used for each stand pipe depending on the length of the latter. As shown in the drawings, the two pipes disposed in the ends of the fluxer chamber are arranged each in a V-shaped groove 60 formed by the contiguous edges of the casing halves. The stand pipes disposed intermediate the ends of the fluxer are arranged in vertically disposed recesses 61, each of which is formed by casting integral with the casing wall a pair of spaced inwardly projecting ribs 62. These ribs not only protect the stand pipe but also provide reinforcement for the casing. A pair of horizontally disposed webs 63 unite the upper and lower ends of the ribs 62 and form a centering seat for the stand pipe. Similar webs 63$^a$ are formed integral with ribs 62 intermediate the ends thereof and are also provided with concave seats for receiving the stand pipe. The ends of each stand pipe are plugged so that the steam is discharged only through the radially and inwardly presented openings and each stand pipe is held in position against its seats by the supply pipes.

The wearing plate 24 is formed in two halves separable along a medial line so that each half may be removed without disturbing the shafts or the casing. The meeting edges of the two halves are provided with semi-circular recesses to provide clearance for shaft bearings 52 which are received therein. These meeting edges are preferably formed beveled as indicated at 24$^a$ so that only the upper faces of the halves meet. This arrangement prevents material from sticking between the edges and insures accurate alignment thereof at all times. The underside of each half of the wearing plate is provided with a series of vertically disposed ribs 24$^b$ which reinforce the plate and space it from supporting plate 25. The upper face of the plate is smooth to provide a smooth working surface for the sweeper arms 48.

The forward half of the plate 24 is provided with a longitudinally disposed opening 64 through which the material is discharged from the fluxer chamber downwardly onto a suitable chute or material conveyor (not shown) located between the pedestals 26 forwardly of the shafts 22. This opening 64 is controlled by a horizontally disposed closure member 65 which is mounted for slidable movement in an extension 66. This extension is fixed at one end to a projection 24$^c$ formed on the forward half of plate 24 and projects outwardly therefrom a suitable distance. Extension 24$^c$ is provided with a horizontally disposed table portion 67 on which rests the downwardly presented shoulder 65$^a$ of plate 65 when the latter occupies retracted or open position. The forward edge of this plate is formed oblique as indicated at 65$^b$ in order to prevent material from entering between the aforesaid edge of the plate and the rear wall 64$^a$ of opening 64.

Extension 66 comprises a pair of horizontally disposed members 68 spaced from each other a suitable distance to receive the plate 65 and connected at their outer ends by a transverse member 69 and intermediate their ends by a cross member 70, which latter is disposed a suitable distance below plate 65 in order to provide operating clearance therebetween.

Side members 68 of extension or bracket 66 are provided on their inner faces with inwardly presented longitudinally disposed runways 71 on which the edges of the gate 65 operate. Each side member 68 is provided with a horizontally disposed shoulder 71$^a$ disposed immediately above tracks 71 and forming an abutment or guide for the edges of the fluxer gate 65.

The forward end of fluxer gate 65 is provided with a depending portion 65$^c$ having a horizontally disposed aperture through which passes freely the threaded portion 72$^a$ of a screw 72. A nut 73 is secured to this depending portion 65$^c$ in any suitable manner, such as securing devices 73$^a$, and has a threaded opening coaxial with the opening in portion 65$^c$ and engageable with the threaded stem 72$^a$. Thus by turning screw 72 in proper direction, fluxer gate 65 can be operated in bracket 66 to either close or open the discharge opening 64. To prevent longitudinal movement of the screw, the end member 69 is provided with a box-shaped portion 69$^a$ and disposed in said box-shaped portion is an annular collar or shoulder 74 formed on the screw 72. An end thrust bearing 75 is disposed to each side of collar 74 and holds screw 72 against axial movement. One of the bearings bears against the rear wall of portion 69$^a$, while the forward bearing is held against collar 74 by a front plate 76 which is secured to the open end of a box 69$^a$ by screws 77.

In this manner the entire assembly carrying the fluxer gate and the mechanism for operating the same is mounted in bracket 66 and the latter is fixed to the forward half of the wearing plate 24. Thus it is not necessary to disturb the gate mechanism when making repairs or inspection of the fluxer or the actuating mechanism therefor. The gate mechanism can be removed by simply detaching the bracket 66 from the wearing plate without necessitating dismantling any other parts or connections. The fluxer gate 65 can be operated to control the size of opening 64 so as to discharge the proper amount of the treated briquetting material.

While the screw 72 can be manually operated, I provide a motor drive therefor so that said gate can be quickly and easily moved. This drive comprises a quill or sleeve 78 which is mounted on the projecting portion 72$^b$ of screw 72 and is free to move in a horizontal direction relatively thereto but is held in non-rotative engagement therewith. A pair of oppositely disposed beveled friction disks 79 is fixed to said sleeve and operating between said disks is a small friction disk pinion 80. This pinion is carried by a shaft of an electric motor 81, which latter is mounted on a shelf 82 with its axis in substantially horizontal plane with the axis of screw 72. Shelf 82 is formed integral with the forward end of one of the side members 68.

The distance between the beveled friction disks 79 is greater than the diameter of small disk 80 so that when the latter is in engagement with one of the disks 79 it is suitably spaced from the opposite disk. By moving the sleeve 78 longitudinally in proper direction, one of said disks 79 is brought into frictional engagement with disk 80 and is actuated thereby, thus driving screw 72 in the appropriate direction to either close or open gate 65. Sleeve 78 can be shifted in any suitable manner. In the form disclosed in the drawings, a shift ring 84 is placed over the hub of the forward disk and is provided with internal projections which cooperate with a groove formed on said hub. This ring is shiftable to cause the sleeve 78 to move either forwardly or rearwardly and bring the appropriate disk 79 into engagement with the small disk 80. Shaft ring 84 is operated by a handle 85 which is pivotally mounted at 86 and is manually operable.

Wearing plate 24 is substantially of the same shape as the bottom of the casing and the supporting plate 25 with the exception of apertured projections 87 which extend beyond said casing and said plate and provide a suitable hold so that the wearing plate sections can be removed or replaced in position.

In the operation of the machine, the coal dust and the binder are delivered by conveyor 10 and discharged into the mixing chamber through opening 18 formed in the top plate 17. As soon as the mixture enters the fluxer it is engaged by the stirring or kneading arms 64 which are mounted on shafts 22. These arms are V-shaped in cross section, increasing in width toward their free ends. The ridge of each arm is presented in the direction of rotation and each arm is slightly inclined rearwardly with respect to the direction of rotation. Due to this peculiar arrangement of arms and to the angularly disposed surfaces thereof, there is exerted a considerable drag against the mixture similar to the action of a bricklayer's trowel when dragged at an angular position over the mortar. The kneading action of the arms is greatly intensified owing to the double angular surfaces of the arms and a thorough working of the mixture is thus obtained.

In addition, a continuous shifting and intermixing of the material takes place as the rotary action of the kneading arms places the material in the paths of the arms of the adjacent shafts which in turn work and knead the mixture, then push it over into the path of the other arms. In actual practice, it was found that for smaller capacities, a very satisfactory mixing and kneading action is obtained with a double set of shafts and kneading arms, but where a very large amount of material has to pass through the mixing chamber for continuous treatment, a three shaft chamber, such as illustrated in the drawings, has been most efficient for the production of stirring briquetting mixture. If briquet presses of very large capacities are built, a fluxer with four shafts can be used.

Stem inlet pipes 58 are disposed in vertical positions inside the fluxing chamber in recesses formed in the wall thereof. Thus the pipes are protected from injury and against strains to which they might be otherwise subjected by the mass of material moved about in the fluxer chamber. Small outlet holes are drilled in these steam pipes and the steam is discharged therethrough into the mixture. The pipes being disposed vertically can be readily fitted in position as no bending of the pipes into suitable forms is required. The supply pipes 59 passing through the casing wall serve to hold the steam pipes in position, and no other securing means is required for the latter.

The fluxer casing 16 consists of a plurality of sections separable on horizontal and vertical planes. The adjacent edges of the sections are flanged and are detachably secured together. Thus any one of the sections can be removed to provide access to the chamber without the necessity of dismantling the casing or the operating mechanism contained therein. Furthermore, as the casing is of considerable size, the construction thereof in sections renders the manufacture and assembly more practical as the sections can be handled more easily than would be possible if the casing were formed in one or two pieces only.

The wearing plate 24 which forms the bottom plate of the casing is formed in two sections, separable on a straight line with the axis of shafts 22 which are also arranged in a straight line. Thus either one of said sections can be removed without dismantling said shafts or the casing. The casing 16 rests on said wearing plate 24 and the latter in turn is carried by the supporting plate 25 which is of substantially the same shape as the bottom end of the casing. The upper face of the wearing plate is finished smooth and operating thereover are discharge sweep arms 48 which agitate the material disposed in the bottom of the casing and move it toward the discharge opening 64.

The cooperative relation of collars 49$^a$ with enlarged ends 51 of bearings 52 provide an efficient seal or packing gland which prevents dust and grit from getting into the bottom bearings of the shafts and the driving gear.

The entire assemblage of the gate 65 and its operating mechanism is mounted in extension or bracket 66 and the latter is detachably fixed to suitable projections of the forward section of wearing plate 24. Consequently the bracket and the mechanism carried thereby can be readily detached without in any way interfering with the rest of the fluxer.

The driving mechanism can be located either on top of or below the fluxer. The bottom drive illustrated in the accompanying drawings, although more expensive, is preferable as it is more efficient.

The provision of stirring arms having double angular surfaces insures more efficient working of the mixture as the pressure produced by the movement of the arms is exerted simultaneously both in upward and downward directions.

My improved fluxer is highly efficient in working briquetting mixture and is so arranged that it can be worked continuously. The sectional features of the casing and the wearing plate enable ready replacment of parts most susceptible to wear and facilitate the transportation and erection of the fluxer.

While I have shown and described herein the preferred form of my fluxer, it is obvious that various changes and arrangements of parts could be made and substituted for those herein shown without departing from the spirit of my invention.

I claim:

1. A fluxer for briquetting material comprising a vertically disposed mixing chamber having its walls provided with a series of spaced vertically disposed recesses opening into said chamber, a plurality of revoluble shafts vertically disposed in said chamber, stirring arms fixed to said shafts and operable in horizontal planes, and a vertically disposed stand pipe arranged in each recess beyond the paths of said arms, each of said pipes having a plurality of discharge openings presented into said chamber for discharging steam thereinto.

2. A fluxer for briquetting material comrising a vertically disposed mixing chamber, a plurality of revolubly mounted shafts vertically disposed therein, stirring arms fixed to said shafts and operable in horizontal planes, a series of vertically disposed steam pipes arranged at spaced intervals within said chamber adjacent to the wall of said chamber out of the paths of said arms for discharging steam into said chamber, and a plurality of vertically disposed ribs formed integral with said wall and extending inwardly on each side of said pipe for protecting the latter against lateral thrusts.

3. A fluxer for briquetting material comprising in combination a vertically disposed casing having a mixing chamber open at top and bottom, a top plate for closing the top of said casing, said top plate being provided with a material intake opening, a bottom plate detachably secured to the lower end of said casing, a plurality of vertically disposed shafts extending through said casing and journaled in said plates, stirring arms carried by said shafts, the wall of said chamber being provided with a series of vertically disposed recesses opening into said chamber, and a series of vertically disposed pipes arranged in the respective recesses and provided with apertures directed into said chamber for introducing heating medium thereinto.

4. A fluxer for briquetting material comprising in combination a vertically disposed casing having a mixing chamber open at top and bottom, a top plate for closing the top of said casing, said top plate being provided with a material intake opening, a bottom plate detachably secured to the lower end of said casing, a plurality of vertically disposed shafts extending through said casing and journaled in said plates, stirring arms carried by said shafts, a series of stand pipes vertically disposed within said casing at spaced intervals alongside the wall thereof for discharging steam thereinto, said pipes terminating short of said plates, and pipe connections extending from the exterior through said casing and secured to said pipes for holding the latter in position and supplying steam thereto.

5. A fluxer for briquetting material comprising in combination a vertically disposed tubular casing open at top and bottom, the vertical wall of said casing being provided with a series of vertically disposed recesses opening into said casing, a top plate for closing the top of said casing, said top plate being provided with a material intake opening, a bottom plate detachably secured to the bottom of said casing and provided with a discharge opening, a plurality of vertically disposed shafts extending through said casing and having bearings in said plates, stirring arms fixed in spaced relation on said shafts, and a series of vertically disposed fluid supply pipes arranged in said recesses out of the paths of said arms, said pipes being provided with a plurality of inwardly presented openings for discharging fluid into said casing.

6. A fluxer for briquetting material comprising in combination a vertically disposed fluxer casing provided with flanged open ends, a top plate detachably secured to and closing the upper end of said casing and provided with a material intake opening, a bottom plates detachably secured to and closing the lower end of said casing and provided with a material discharge opening, aligned shaft bearings carried by said plates, a plurality of vertically disposed shafts journaled in said bearings and extending through said casing, stirring arms carried at spaced intervals by said shafts, and a series of vertically disposed pipes arranged at spaced intervals within said casing adjacent to the vertical wall thereof for introducing heating medium into said casing, said pipes being arranged beyond the paths of said arms.

7. In a fluxer for briquetting material the combination of a vertically disposed casing having a mixing chamber open at top and bottom, a top plate detachably secured to and closing the upper end of said casing and provided with a material intake opening, a bottom plate comprising two sections separable along a medial line detachably secured to and closing the lower end of said casing, the forward section being provided with a material discharge opening, bearings disposed in the top plate, bearings arranged in said bottom plate, each of said last-mentioned bearings consisting of a pair of sectional members separable in correlation with the sections of said bottom plate, and a plurality of vertically disposed shafts extending through said casing and revolubly mounted in said bearings.

8. A fluxer for briquetting material comprising a vertically disposed casing having a mixing chamber open at top and bottom, a top plate detachably secured to and closing the upper end of said casing and provided with a material intake opening, a bottom plate comprising two sections separable along a medial line detachably secured to and closing the lower end of said casing, the forward section being provided with a material discharge opening, bearings disposed in the top plate, bearings arranged in said bottom plate, each of said last-mentioned bearings consisting of a pair of sectional members separable in correlation with the sections of said bottom plate, a plurality of vertically disposed shafts extending through said casing and revolubly mounted in said bearings, stirring arms carried by said shafts, a support plate carrying said sectional bottom plate, whereby either one of said sections of said bottom plate can be removed without disturbing the other section or said casing, supports for carrying said support plate, said revoluble shafts extending below said support plate, a gear fixed to each shaft below said support plate in engagement with the adjacent gear whereby all of said shafts are simultaneously operated, and means for driving said shafts.

9. A fluxer for briquetting material comprising a vertically disposed casing having a mixing chamber open at top and bottom, a top plate detachably secured to and closing the upper end of said casing and provided with a material intake opening, a bottom plate comprising two sections separable along a medial line detachably secured to and closing the lower end of said casing, the forward section being provided with a material discharge opening, bearings disposed in the top plate, bearings arranged in said bottom plate, each of said last-mentioned bearings consisting of a pair of sectional members separable in correlation with the sections of said bottom plate, a plurality of vertically disposed shafts extending through said casing and revolubly mounted in said bearings, stirring arms carried by said shafts, a support plate carrying said sectional bottom plate, whereby either one of said sections of said bottom plate can be removed without disturbing the other section or said casing, supports for carrying said support plate, said revoluble shafts extending below said support plate, a gear fixed to each shaft below said support plate in engagement with the adjacent gear whereby all of said shafts are simultaneously operated, means for driving said shafts, and means arranged within said casing out of the paths of said arms for introducing heat into said casing.

10. A fluxer for briquetting material comprising a vertically disposed casing having a mixing chamber open at top and bottom, a top plate for closing the top of said casing, a wearing plate forming the bottom of said casing, said plate comprising a pair of sections separable on a medial line and detachably secured to the lower end of said casing independently of each other, vertically disposed sectional bearings disposed in said bottom plate and separable longitudinally in alignment with the sections of said bottom plate, a plurality of vertically disposed shafts extending through said casing and journaled in said top plate and in said bottom plate sectional bearings, a support plate supported at each end and carrying said sectional bottom plate, bearings formed in said support plate for receiving said shafts whereby either one of said bottom plate sections can be detached without disassembling said casing or said shafts, stirring arms carried by said shafts within said casing, and a train of gears disposed below said support plate for driving all of said shafts.

11. A fluxer for briquetting material comprising a vertically disposed casing open at the bottom, a bottom plate therefor, said plate comprising a pair of cooperating sections separable on a medial line, each of which is detachably secured to the bottom of said casing, a support plate supported at each end and carrying said sectional bottom plate whereby either one of said bottom plate sections can be removed without disturbing the rest of the structure, bearings disposed in said bottom plate and the top of said casing, a plurality of vertically disposed shafts revolubly mounted in said bearings and extending below said support plate, a packing gland arranged in said bottom plate for each shaft to prevent briquetting material from entering the shaft bearings, the meeting edges of the sections of said bottom plate being provided with semi-circular recesses for receiving said packing gland, stirring arms disposed in said casing and carried by said shafts, an extenson carried by one of said bottom plate sections, and a gate operatively mounted in said extension and operable to open and close a discharge opening formed in the last bottom plate section.

12. In a fluxer for briquetting material the combination with a vertically disposed fluxer casing and a bottom plate detachably secured to the bottom of said casing and provided with a discharge opening of a horizontal extension fixed to the forward half of said bottom plate and projecting outwardly therefrom, a horizontally disposed gate mounted in said extension and operable to open and close said discharge opening, and motor driven means mounted in said extension for actuating said gate in either direction.

13. A fluxer for briquetting material comprising a vertically disposed fluxer casing open at top and bottom, a top plate for closing the top thereof, a support, a bottom plate interposed between said support and the lower end of said casing and comprising a pair of separable sections, one of the sections being provided with a discharge opening, said bottom plate sections being carried by said support independently of each other whereby either section can be removed, a plurality of vertically disposed revoluble shafts extending through said casing and journaled in said top plate and said support, said shafts being disposed in alignment with the line of separation of said bottom plate sections, packing glands arranged in said bottom plate sections at points where said shafts extend therethrough, thereby excluding briquetting material from said shaft openings, stirring arms fixed in spaced-apart relation on said shafts, and means for controlling said discharge opening.

14. A fluxer for briquetting material comprising a vertically disposed fluxer casing open at top and bottom, a top plate for closing the top thereof, shaft bearings in said top plate, a wearing plate forming the bottom of said casing, said wearing plate comprising a pair of sections separable on a medial line and detachably secured to the bottom of said casing independently of each other, one of said sections being provided with a discharge opening, a support plate disposed below said wearing plate and supporting the sections thereof independently of each other, shaft bearings arranged in said support plate, a plurality of vertically disposed revoluble shafts extending through said casing and journaled in said bearings, shaft bearings disposed in said wearing plate, the upper end of each of said wearing plate shaft bearings being disposed above said plate and provided with a flared mouth, a collar fixed to each shaft, said collar having its lower end enlarged to fit over the projecting end of said bearing and form a recess above said flared mouth, packing material disposed in the chamber formed by said collar and said mouth to form a packing gland for said shaft and prevent briquetting material from entering the shaft bearings, stirring arms disposed in said casing and carried by said shafts, driving means for actuating all of said shafts, and a fluxer gate operatively carried by one of said wearing plate sections and operable to open and close the discharge opening formed therein.

15. A fluxer for briquetting material comprising a vertically disposed fluxer casing, a wearing plate forming a bottom for said casing and comprising a pair of sections separable on a medial line, each of which is detachably secured to said casing independently of the other, one of said sections being provided with a discharge opening, a supporting plate for supporting said wearing plate sections independently of each other, a plurality of vertically disposed revoluble shafts extending through said casing and through said wearing plate, said shafts being disposed in a straight line with their axes in alignment with the medial line of separation of said wearing plate sections, a packing gland cooperating with each shaft and said wearing plate, said packing gland comprising a shaft bearing extending through said wearing plate and provided with an enlarged upper end projecting thereabove and having a flared-out mouth adapted to receive packing material, and a collar secured to each shaft and having an enlarged lower end overlapping the upper end of said shaft bearing and provided with a recess cooperating with said flared-out mouth to form a packing material chamber, the meeting edges of said wearing plate sections being provided with semi-circular cooperating recesses for receiving said shaft bearings, stirring arms fixed in spaced-apart relation on said shafts within said casing, means for driving all of said shafts simultaneously and at a uniform speed, and mechanism for controlling said discharge opening.

16. A fluxer for briquetting material comprising a vertically disposed fluxer casing, a wearing plate forming a bottom for said casing and comprising a pair of sections separable on a medial line, each of which is detachably secured to said casing independently of the other, one of said sections being provided with a discharge opening, a supporting plate for supporting said wearing plate sections independently of each other, a plurality of vertically disposed revoluble shafts extending through said casing and through said wearing plate, said shafts being disposed in a straight line with their axes in alignment with the medial line of separation of said wearing plate sections, a packing gland cooperating with each shaft and said wearing plate, said packing gland comprising a shaft bearing extending through said wearing plate and provided with an enlarged upper end projecting thereabove and having a flared out mouth adapted to receive packing material, said shaft bearings being separable on a medial line in correlation with the line of separation of said wearing plate sections, and a longitudinally separable collar secured to each shaft and having an enlarged lower end overlapping the upper end of said shaft bearing and provided with a recess cooperating with said flared out mouth to form a packing material chamber, the meeting edges of said wearing plate sections being provided with semi-circular cooperating recesses for receiving said shaft bearings, stirring arms fixed in spaced-apart relation on said shafts within said casing, means for driving all of said shafts simultaneously and at a uniform speed, and mechanism for controlling said discharge opening.

17. A fluxer for briquetting material comprising a vertically disposed casing, a wearing plate forming the bottom of said casing and comprising a pair of sections separable on a medial line, each of which is detachably secured to said casing independently of the other, a supporting plate carrying said wearing plate sections, a plurality of shafts extending vertically through said casing and below said sectional wearing plate and journaled independently of the latter, said shafts being arranged in a straight line with their axes in alignment with the line of separation of said sections, whereby either one of said sections can be removed without disturbing the other parts, stirring arms fixed to said shafts and disposed in spaced-apart relation in said casing, a bracket detachably secured to the forward wearing plate section, a fluxer gate slidably mounted in said bracket and operable to open and close the discharge opening formed in said forward section, and manually controlled motor driven mechanism carried by said bracket for actuating said gate in either direction.

18. A fluxer for briquetting material comprising a vertically disposed casing, a wearing plate forming the bottom of said casing and comprising a pair of sections separable on a medial line, each of which is detachably secured to said casing independently of the other, a supporting plate carrying said wearing plate sections, a plurality of shafts extending vertically through said casing and below said sectional wearing plate and journaled independently of the latter, said shafts being arranged in a straight line with their axes in alignment with the line of separation of said sections, whereby either one of said sections can be removed without disturbing the other parts, stirring arms fixed to said shafts and disposed in spaced-apart relation in said casing, a bracket detachably secured to the forward wearing plate section, a fluxer gate slidably mounted in said bracket and operable to open and close the discharge opening formed in said forward section, a screw rotatably mounted in said bracket and in threaded engagement with said gate for actuating the latter in either direction, and means for actuating said screw.

19. A fluxer for briquetting material comprising a vertically disposed casing, a wearing plate forming the bottom of said casing and comprising a pair of sections separable on a medial line, each of which is detachably secured to said casing independently of the other, a supporting plate carrying said wearing plate sections, a plurality of shafts extending vertically through said casing and below said sectional wearing plate and journaled independently of the latter, said shafts being arranged in a straight line with their axes in alignment with the line of separation of said sections, whereby either one of said sections can be removed without disturbing the other parts, stirring arms fixed to said shafts and disposed in spaced-apart relation in said casing, a bracket detachably secured to the forward wearing plate section, a fluxer gate slidably mounted in said bracket and operable to open and close the discharge opening formed in said forward section, a screw rotatably mounted in said bracket and held against longitudinal movement, said screw being in threaded engagement with said gate for actuating the latter in either direction, means in non-rotative engagement with said screw and movable longitudinally thereof, and a power driven member engageable with said means for actuating said screw.

20. In a fluxer for briquetting material the combination with a vertically disposed casing, and a wearing plate forming the bottom therefor, of a bracket detachably secured to the forward portion of said wearing plate and extending outwardly therefrom, a horizontally disposed fluxer gate slidably mounted in said bracket and operable to open and close a discharge opening formed in said wearing plate, a screw, longitudinally and revolubly mounted in said bracket and held against longitudinal movement, said screw being in threaded engagement with said gate for actuating the latter in either direction, a pair of opposed friction disks in non-rotative engagement with said screw, and a driven disk adapted to operatively engage either one of said friction disks to actuate said screw in a corresponding direction.

21. A fluxer for briquetting material comprising a vertically disposed casing, a wearing plate forming the bottom of said casing and comprising a pair of sections separable on a medial line, each of which is detachably secured to said casing independently of the other, a supporting plate carrying said wearing plate sections, a plurality of shafts extending vertically through said casing and below said sectional wearing plate and journaled independently of the latter, said shafts being arranged in a straight line with their axes in alignment with the line of separation of said sections, whereby either one of said sections can be removed without disturbing the other parts, stirring arms fixed to said shafts and disposed in spaced-apart relation in said casing, a bracket detachably secured to the forward wearing plate section, a fluxer gate slidably mounted in said bracket and operable to open and close the discharge opening formed in said forward section, a screw revolubly mounted in said bracket and held against longitudinal movement, said screw being in threaded engagement with said gate for actuating the latter in either direction, a pair of opposed friction disks in non-rotative engagement with said screw, a driven disk adapted to operatively engage either one of said friction disks to actuate said screw in a corresponding direction, and means for controlling the interengagement between said driven disk and either one of said friction disks.

22. A fluxer for briquetting material comprising a vertically disposed casing, a wearing plate forming the bottom of said casing and comprising a pair of sections separable on a medial line, each of which is detachably secured to said casing independently of the other, a supporting plate carrying said wearing plate sections, a plurality of shafts extending vertically through said casing and below said sectional wearing plate and journaled independently of the latter, said shafts being arranged in a straight line with their axes in alignment with the line of separation of said sections, whereby either one of said sections can be removed without disturbing the other parts, stirring arms fixed to said shafts and disposed in spaced-apart relation in said casing, a bracket detachably secured to the forward wearing plate section, a fluxer gate slidably mounted in said bracket and operable to open and close the discharge opening formed in said forward section, a screw rotatably mounted in said bracket and held against longitudinal movement therein, said screw being in threaded engagement with said gate for actuating the latter in either direction, a sleeve slidably mounted on said screw and held in non-rotative engagement therewith, a pair of opposed friction disks fixed to said sleeve, a driven disk disposed between said friction disks and adapted to be engaged by either one of the latter to actuate said screw in a corresponding direction, and a shift ring mounted on said sleeve and operable to impart thereto longitudinal movement in the appropriate direction.

23. In a fluxer, a shaft seal comprising in combination with a fluxer shaft and a fluxer bottom plate, a shaft bearing carried by said bottom plate and having its upper end projecting thereabove, said end being provided with a flared out mouth, and a collar fixed to said shaft and having a recessed lower end overlapping the projecting end of said bearing and cooperating with the mouth of the latter to form a packing chamber surrounding said shaft.

24. In a fluxer, a shaft seal comprising in combination with a sectional bottom plate of a fluxer, and a fluxer shaft journaled independently of said bottom plate, of a shaft bearing carried by said sectional bottom plate and having its upper end projecting thereabove, said end being provided with a flared out mouth and said shaft bearing being separable on a medial line in alignment with the sections of said plate, and a longitudinally separable collar fixed to said shaft and having its lower end recessed and overlapping the projecting end of said bearing, there being formed a packing chamber by said collar and said bearing for receiving shaft packing material.

25. In a fluxer, a shaft seal, comprising in combination with a fluxer shaft and a wearing plate forming the bottom of the fluxer casing, of a shaft bearing carried by said wearing plate and having a projecting recessed end, and a sweep arm fixed to said shaft and operating over the surface of said plate, said sweep arm being provided with a recessed collar fitting over the projecting end of said bearing and forming in cooperation therewith a packing chamber, and packing material arranged in said chamber for sealing said shaft.

26. In a fluxer, a sectional fluxer casing, comprising a plurality of sections separable on a medial line, each of said sections being provided with vertically disposed flanges formed integral with the edges thereof, means for engaging the contiguous flanges and securing said sections together, and a bottom plate for said casing, said plate comprising two separable sections arranged in juxtaposed relation and removable independently of each other and of said casing.

27. In a fluxer, a sectional fluxer casing comprising a plurality of sections separable on vertical and horizontal planes, flanges formed integral and coextensive with the meeting edges of said sections, means for engaging the adjacent flanges and detachably securing said sections together, a support, and a bottom plate for said casing and interposed between said support and the lower end of said casing, said bottom plate being formed of two longitudinal sections arranged in juxtaposed relation and removable independently of each other and independently of said support and said casing.

28. In a fluxer, the combination with a vertically disposed open-ended fluxer casing, of a top plate detachably secured to the top end thereof, and a horizontally disposed wearing plate detachably secured to the bottom thereof, said wearing plate being formed in two horizontally disposed sections arranged in the same horizontal plane and separable on a medial line, each of which is secured in position and supported independently of the other.

29. In a fluxer, a sectional fluxer casing comprising wall sections separable on vertical and horizontal planes, each section being provided with flanges formed integral with the meeting edges, means for engaging the adjacent flanges and detachably securing the sections together, a top plate detachably secured to the top of said casing, and a wearing plate forming the bottom for said casing, said wearing plate being formed in two sections separable on a medial line, each of said bottom sections being detachably secured in position and supported independently of the other.

30. In a fluxer, a plurality of vertically disposed spaced-apart shafts, and a series of stirring arms fixed to said shafts, each arm having double oppositely disposed angular surfaces, the apices of said surfaces being disposed in a horizontal plane and said arms being operable in horizontal planes, for exerting pressure against the briquetting mixture simultaneously in upward and downward directions.

31. In a fluxer, a vertically disposed casing, a vertically disposed revoluble shaft extending therethrough, and a series of horizontally disposed arms fixed to said shaft in spaced-apart relation, each arm comprising a pair of oppositely disposed oblique surfaces, the apex formed by said surfaces, being arranged in a horizontal plane, and said arms being operable in horizontal planes for working the briquetting mixture simultaneously in both upward and downward directions.

32. In a fluxer, a wearing plate forming the bottom of said fluxer, said plate comprising two sections separable on a medial line, each of said sections having extensions projecting laterally beyond said fluxer to provide suitable holds for positioning said sections.

33. In a fluxer, a wearing plate forming the bottom of said fluxer, said plate comprising a plurality of separable sections removable independently of each other, the meeting edges of said sections being disposed obliquely in opposite directions and provided with cooperating recesses for receiving shaft bearings.

34. In a fluxer, a wearing plate forming the bottom of said fluxer, said plate comprising a plurality of separable sections removable independently of each other, the meeting edges of said sections being provided with cooperating recesses for receiving shaft bearings, and each sections being formed with an extension projecting laterally to enable manipulation of said section.

In testimony whereof I hereunto affix my signature this 10th day of July, 1928.

GUSTAV KOMAREK.